United States Patent
Mizutani

(10) Patent No.: US 9,780,360 B2
(45) Date of Patent: Oct. 3, 2017

(54) CATHODE MIXTURE, CATHODE, SOLID BATTERY AND METHOD FOR PRODUCING CATHODE MIXTURE, CATHODE AND SOLID BATTERY

(71) Applicant: Toyota Jidosha Kabushiki Kaisha, Toyota-shi, Aichi-ken (JP)

(72) Inventor: Satoshi Mizutani, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 82 days.

(21) Appl. No.: 14/843,186

(22) Filed: Sep. 2, 2015

(65) Prior Publication Data

US 2016/0072120 A1   Mar. 10, 2016

(30) Foreign Application Priority Data

Sep. 10, 2014 (JP) .................. 2014-184495

(51) Int. Cl.
| | |
|---|---|
| H01M 4/13 | (2010.01) |
| H01M 4/131 | (2010.01) |
| H01M 4/62 | (2006.01) |
| H01M 10/0525 | (2010.01) |
| H01M 4/1391 | (2010.01) |
| H01M 4/505 | (2010.01) |
| H01M 4/525 | (2010.01) |
| H01M 10/0562 | (2010.01) |

(Continued)

(52) U.S. Cl.
CPC ......... *H01M 4/131* (2013.01); *H01M 4/1391* (2013.01); *H01M 4/625* (2013.01); *H01M 10/0525* (2013.01); *H01M 4/505* (2013.01); *H01M 4/525* (2013.01); *H01M 10/0562* (2013.01); *H01M 10/0585* (2013.01); *H01M 2004/021* (2013.01); *H01M 2004/028* (2013.01); *H01M 2220/20* (2013.01); *H01M 2220/30* (2013.01); *H01M 2300/0068* (2013.01); *Y02E 60/122* (2013.01)

(58) Field of Classification Search
None
See application file for complete search history.

(56) References Cited

U.S. PATENT DOCUMENTS

2016/0204424 A1*   7/2016   Sawai ................. B60L 11/1879
                                                             429/332

FOREIGN PATENT DOCUMENTS

| JP | 2002-063937 A | 2/2002 |
|---|---|---|
| JP | 2007-080652 A * | 3/2007 |

(Continued)

OTHER PUBLICATIONS

JP 2007-080652 A English.*

*Primary Examiner* — Scott J Chmielecki
(74) *Attorney, Agent, or Firm* — Dinsmore & Shohl LLP

(57) ABSTRACT

Provided is a cathode mixture which can have both ion conductivity and electron conductivity and with which a solid battery having an excellent output characteristic can be obtained.

The cathode mixture includes a plurality of cathode active material particles, a fibrous electroconductive material, a particulate electroconductive material, and a solid electrolyte, wherein setting the total number of the plurality of cathode active material particles as 100%, the number of the cathode active material particles in contact with the fibrous electroconductive material via the particulate electroconductive material is 40% or more.

8 Claims, 8 Drawing Sheets

(51) Int. Cl.
   *H01M 10/0585* (2010.01)
   *H01M 4/02* (2006.01)

(56) References Cited

FOREIGN PATENT DOCUMENTS

| | | | |
|---|---|---|---|
| JP | 2007080652 A | * | 3/2007 |
| JP | 2008-034376 A | | 2/2008 |
| JP | 2012-014993 A | | 1/2012 |
| WO | 2013146454 A1 | | 10/2013 |

* cited by examiner

CATHODE MIXTURE, CATHODE, SOLID BATTERY AND METHOD FOR PRODUCING CATHODE MIXTURE, CATHODE AND SOLID BATTERY

TECHNICAL FIELD

The present invention relates to a cathode mixture having both ion conductivity and electron conductivity.

BACKGROUND ART

A solid battery is known as a battery excellent in safety. The solid battery includes a cathode, an anode, and a solid electrolyte layer as a separator layer between the cathode and anode. The cathode mixture composing the cathode of a solid battery includes a cathode active material, an electroconductive material, a solid electrolyte, and the like. Specifically, the cathode can improve its electron conductivity by including an electroconductive material in the cathode mixture. As the electroconductive material, particulate electroconductive materials, fibrous electroconductive materials and the like are known (WO 2013/146454), and various studies have been done regarding compounding forms of electroconductive materials in the cathode mixture.

On the other hand, though not being a technique according to a solid battery, JP 2007-080652 A for example describes that it is possible to obtain a lithium ion battery having a high discharging capacity at a high speed charge rate and exerting a performance of sufficient charge-discharge rate by using an electroconductive material consisting of two or more kinds of particles whose sizes or forms are different from each other, to compose a cathode of the lithium ion battery. JP 2008-034376 A describes that it is possible to obtain a lithium ion battery having an excellent high speed discharging performance by using a cathode mixture containing a particulate electroconductive material whose primary particle size is 10 to 100 nm, a fibrous electroconductive material whose fiber size is 1 nm to 1 µm, and an electroconductive material whose aspect ratio is 2 to 50, to compose a cathode of the lithium ion battery. JP 2002-063937 A describes that it is possible to obtain a lithium ion secondary battery having a largely improved low temperature characteristic and rate characteristic by using a cathode mixture including a particulate electroconduitive material whose particle size is 3 µm or more and a particulate electroconductive material whose particle size is 2 µm or less or a fibrous electroconductive material whose aspect ratio is 3 or more and whose fiber size is 2 µm or less, to compose a cathode of the lithium ion secondary battery. In addition, though not being a technique according to a solid battery but an anode, a technique to use two kinds of graphite electroconductive materials whose average lengths are different from each other is also known.

SUMMARY OF INVENTION

Technical Problem

In the electrolytic solution batteries disclosed in JP 2007-080652 A, JP 2008-034376 A, JP 2002-063937 A and JP 2012-014993 A, the electrolytic solution reaches every corner of the cathode mixture layer, whereby the electrolytic solution can appropriately have contact with the cathode active material. Therefore, it is possible to easily secure ion conducting paths. In addition, by covering the surfaces of the cathode active material particles with the particulate electroconductive material, it is possible to easily secure electron conductivity with the active material particles having contact with one another, and by including a fibrous electroconductive material, it is possible to further improve the electron conductivity.

On the other hand, in a cathode of a solid battery, ions cannot react with cathode active materials without a solid electrolyte around the active materials. Therefore, when only ion conductivity is considered, the circumference of a cathode active material is better to be filled with a solid electrolyte. However, if the circumference of the cathode active material is filled with the solid electrolyte, the electron conductivity in the cathode degrades. Therefore, when the electron conductivity is considered, it is better that an electroconductive material exists at the circumference of the cathode active material. Especially with a fibrous electroconductive material existing between the cathode active material particles, electron conductive paths from a cathode current collector to the active material particles can be easily secured.

Here, in a case where a fibrous electroconductive material is included in the cathode mixture, if the amount of the fibrous electroconductive material is too large, an excessive amount of the fibrous electroconductive material exists between the cathode active material particles which blocks the conductive paths to the solid electrolyte to degrade the ion conductivity, which results in a degradation of the output of the battery. This is because, differently from electrolytic solution batteries, the solid electrolyte does not easily reach each corner of the cathode mixture layer in a solid battery. On the other hand, if the amount of the fibrous electroconductive material is too small, the electron conductivity of the cathode degrades, which also results in a degradation of the output of the battery. As described, a cathode including a solid electrolyte has a problem of achieving both ion conductivity and electron conductivity.

Accordingly, an object of the present invention is to provide a cathode mixture and a cathode with which it is possible to obtain a solid battery capable of achieving both ion conductivity and electron conductivity and having an excellent output characteristic, and to provide a solid battery having an excellent output characteristic.

Solution to Problem

As a result of intensive studies, the inventor of the present invention has found the followings: by using in combination a fibrous electroconductive material and a particulate electroconductive material in a cathode mixture, and by increasing the number of "cathode active material particles in contact with the fibrous electroconductive material via the particulate electroconductive material to a predetermined number or more", it is possible to obtain a cathode having a high electron conductivity with a less addition amount of fibrous electroconductive material and to obtain a solid battery having an excellent output characteristic; and by reducing the addition amount of the fibrous electroconductive material, it is possible to secure conducive paths to a solid electrolyte, whereby it is possible to obtain a cathode having a high ion conductivity and to obtain a solid battery having an excellent output characteristic.

The present invention has been made on the basis of the above findings. That is, a first aspect of the present invention is a cathode mixture including a plurality of cathode active material particles, a fibrous electroconductive material, a particulate electroconductive material, and a solid electrolyte, wherein setting a total number of the plurality of cathode active material particles as 100%, number of the cathode active material particles in contact with the fibrous electroconductive material via the particulate electroconductive material is 40% or more.

The term "fibrous electroconductive material" refers to a carbonaceous electroconductive material whose fiber size is no less than 10 nm and no more than 1 μm and whose aspect ratio is 20 or more.

The term "particulate electroconductive material" refers to a carbonaceous electroconductive material whose primary particle size is no less than 5 nm and no more than 100 nm and whose aspect ratio is less than 2.

The term "cathode active material particles in contact with the fibrous electroconductive material via the particulate electroconductive material" means, in other words, that the particulate electroconductive material is in contact with both the cathode active material particle and the fibrous electroconductive material, at least at a part of the cathode active material particle.

It should be noted that a cathode active material having both the "part in contact with the fibrous electroconductive material via the particulate electroconductive material" and the "part in contact with the fibrous electroconductive material not via the particulate electroconductive material" is also counted as the "cathode active material particles in contact with the fibrous electroconductive material via the particulate electroconductive material". That is, cathode active material particles not considered as the "cathode active material particles in contact with the fibrous electroconductive material via the particulate electroconductive material" according to the present invention are two kinds of "a cathode active material particle not in contact with the particulate electroconductive material" and "a cathode active material particle in contact with one or more particulate electroconductive materials which are not in contact with the fibrous electroconductive material".

In the first aspect of the present invention, it is preferable that, setting a total amount of the cathode active material particles, the fibrous electroconductive material, the particulate electroconductive material, and the solid electrolyte as 100 mass %, the fibrous electroconductive material and the particulate electroconductive material are included in an amount of no less than 0.5 mass % and no more than 2.5 mass % in total.

In the first aspect of the present invention, it is preferable that, setting a total amount of the fibrous electroconductive material and the particulate electroconductive material as 100 mass %, the particulate electroconductive material is included in an amount of no less than 20 mass % and no more than 60 mass %.

The cathode mixture according to the first aspect of the present invention may further include a binder.

A second aspect of the present invention is a cathode including a layer consisting of the cathode mixture of the first aspect of the present invention.

A third aspect of the present invention is a solid battery including the cathode according to the second aspect of the present invention, a solid electrolyte layer, and an anode.

A fourth aspect of the present invention is a method for producing the cathode mixture of the first aspect of the present invention, the method including a first step of mixing a fibrous electroconductive material and a particulate electroconductive material to obtain a first mixture, a second step of mixing the first mixture and a cathode active material to obtain a second mixture, and a third step of mixing the second mixture and a solid electrolyte to obtain a third mixture.

In the fourth aspect of the present invention, it is preferable that mixing ratios in the first step, second step, and third step are adjusted so that in the third mixture, the fibrous electroconductive material and the particulate electroconductive material are included in an amount of no less than 0.5 mass % and no more than 2.5 mass % in total, setting a total amount of the cathode active material particles, the fibrous electoconductive material, the particulate electroconductive material, and the solid electrolyte as 100 mass %.

In the fourth aspect of the present invention, it is preferable that a mixing ratio in the first step is adjusted so that in the first mixture, the particulate electroconductive material is included in an amount of no less than 20 mass % and no more than 60 mass %, setting a total amount of the fibrous electroconductive material and the particulate electroconductive material as 100 mass %.

In the fourth aspect of the present invention, the method may further include a fourth step of mixing the third mixture and a binder to obtain a fourth mixture.

A fifth aspect of the present invention is a method for producing a cathode including a step of forming the cathode mixture obtained by the method according to the fourth aspect of the present invention.

A sixth aspect of the present invention is a method for producing a solid battery, the method including a step of laminating the cathode obtained by the method according to the fifth aspect of the present invention, a solid electrolyte layer, and an anode.

Advantageous Effect of Invention

According to the present invention, it is possible to provide a cathode mixture and a cathode with which it is possible to obtain a solid battery capable of achieving both ion conductivity and electron conductivity and having an excellent output characteristic.

DESCRIPTION OF EMBODIMENTS

Figure 1:
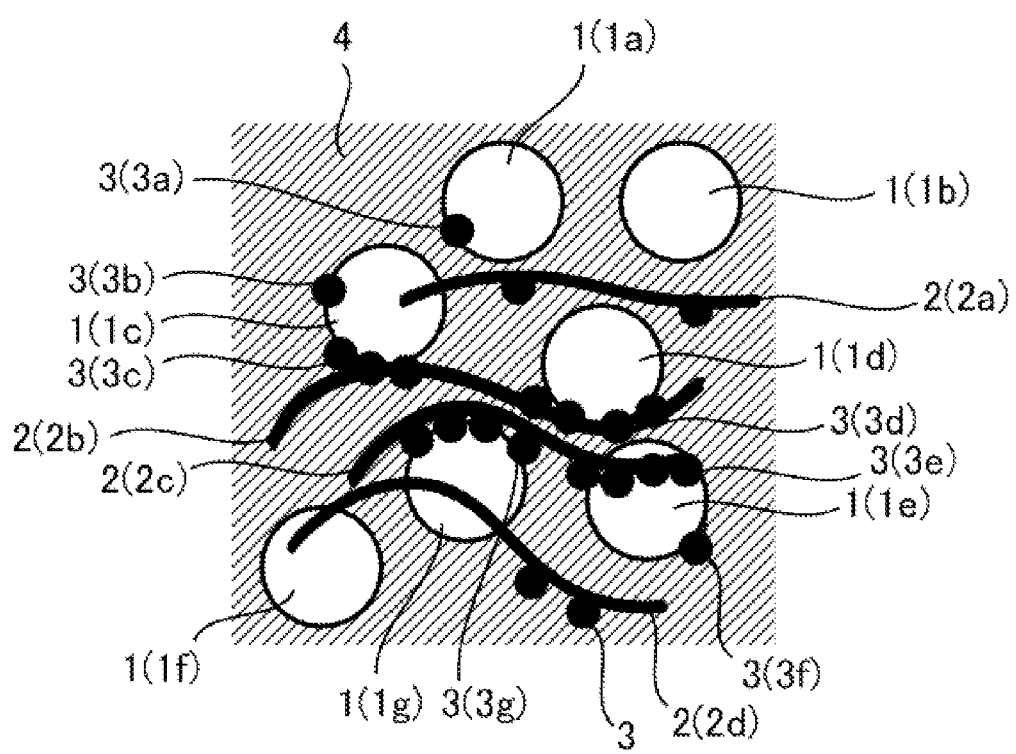
FIG. 1 is a view to explain an embodiment of a cathode mixture according to the present invention.

In a solid battery, ions cannot react with cathode active materials, without a solid electrolyte existing at the circumferences of the cathode active materials of a cathode mixture layer. Therefore, it is better that the circumferences of cathode active material particles are filled with a solid electrolyte. On the other hand, the electron conductivity between the cathode active material particles is difficult to be secured only with the solid electrolyte interposing between the cathode active material particles. Thus the cathode mixture layer needs to include an electroconductive material. Here, since sufficient electron conductivity cannot be obtained only with a particulate electroconductive material included, the cathode mixture layer needs to include a fibrous electroconductive material. However, if the cathode mixture includes an excessive amount of the fibrous electroconductive material, ion conductive paths are blocked. As described, a cathode including a solid electrolyte has a problem of achieving both ion conductivity and electron conductivity. The present invention has been made by the finding that the problem of the cathode mixture including a solid electrolyte as described above can be solved in a case where the ratio of the particulate electroconductive material existing between the fibrous electroconductive material and the cathode active material particles is over a certain value in the cathode mixture. Hereinafter the cathode mixture according to the present invention will be described.

1. Cathode Mixture

The cathode mixture of the present invention includes a plurality of cathode active material particles, a fibrous electroconductive material, a particulate electroconductive material, and a solid electrolyte, wherein setting a total number of the plurality of cathode active material particles as 100%, number of the cathode active material particles in contact with the fibrous electroconductive material via the particulate electroconductive material is 40% or more.

1.1. Cathode Active Material Particle

The cathode mixture according to the present invention includes a plurality of cathode active material particles. The cathode active material particles consist of known materials as materials of a cathode active material of a solid battery. Materials which can absorb and release lithium ions are especially preferable. Examples thereof include $LiCoO_2$, $LiNi_xCo_{1-x}O_2$ ($0<x<1$), $LiNi_xCo_yMn_{1-x-y}O_2$ ($0<x<1$, $0<y<1$ and $0<x+y<1$), $LiNi_xMn_{1-x}O_2$ ($0<x<1$), $LiMnO_2$, different kind element substituent Li—Mn spinels ($LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$, $LiMn_{1.5}Zn_{0.5}O_4$, $LiCr_{0.05}Ni_{0.50}Mn_{1.45}O_4$, $LiCrMnO_4$), lithium titanates (for example $Li_4Ti_5O_{12}$), lithium metal phosphates ($LiFePO_4$, $LiMnPO_4$, $LiCoPO_4$, $LiNiPO_4$), transition metal oxides ($V_2O_5$, $MoO_3$), $TiS_2$, carbon materials such as graphite and hard carbons, LiCoN, $SiO_2$, $Li_2SiO_3$, $Li_4SiO_4$, lithium metals (Li), lithium alloys (LiSn, LiSi, LiAl, LiGe, LiSb, LiP), $Li_2MnO_3$—$LiNi_{1/3}Co_{1/3}Mn_{1/3}O_2$ solid solution, $Li_2MnO_3$—$LiNi_{0.5}Mn_{1.5}O_2$ solid solution, $Li_2MnO_3$—$LiFeO_2$ solid solution, and lithium storable intermetallic compounds (for example $Mg_2Sn$, $Mg_2Ge$, $Mg_2Sb$, $Cu_3Sb$).

The particle size of the primary particle of the cathode active material particles is not particularly limited and normally no less than 100 nm and no more than 3 μm. The lower limit is preferably 500 nm or more, and the upper limit is preferably 2 μm or less. In the cathode mixture according to the present invention, the primary particles of the cathode active material particles can gather to form a secondary particle. In this case, the particle size of the secondary particle is not particularly limited and normally no less than 3 μm and no more than 50 μm. The lower limit is preferably 4 μm or more and the upper limit is preferably 20 μm or less. By making the size of the cathode active material particles in such a range, it is possible to obtain a cathode further excellent in ion conductivity and electron conductivity.

The cathode mixture according to the present invention preferably includes the cathode active material particles in an amount of no less than 40 mass % and no more than 99 mass %, setting the total amount of the cathode active material particles, the fibrous electroconductive material, the particulate electroconductive materials, and the solid electrolyte described below as 100 mass %. The lower limit is more preferably 50 mass % or more and further preferably 55 mass % or more. The upper limit is more preferably 95 mass % or less and further preferably 90 mass % or less. By making the contained amount of the cathode active material in such a range, it is possible to obtain a cathode further excellent in ion conductivity and electron conductivity.

1.2. Fibrous Electroconductive Material

The cathode mixture according to the present invention includes a fibrous electroconductive material. The fibrous electroconductive material is a carbonaceous electroconductive material whose fiber size is no less than 10 nm and no more than 1 μm, and whose aspect ratio is 20 or more. The lower limit of the fiber size of the fibrous electroconductive material is preferably 30 nm or more, more preferably 50 nm or more, and the upper limit is preferably 700 nm or less, more preferably 500 nm or less. The lower limit of the aspect ratio of the fibrous electroconductive material is preferably 30 or more, and more preferably 50 or more. By making the fibrous electroconductive material have the fiber size and aspect ratio (especially aspect ratio) in such ranges, the effect of the present invention can be further remarkably exerted.

1.3. Particulate Electroconductive Material

The cathode mixture of the present invention includes a particulate electroconductive material. The particulate electroconductive material is a carbonaceous electroconductive material whose primary particle size is no less than 5 nm and no more than 100 nm, and whose aspect ratio is less than 2. The lower limit of the primary particle size of the particulate electroconductive material is preferably 10 nm or more, more preferably 15 nm or more, and the upper limit is preferably 80 nm or less, more preferably 65 nm or less. In addition to the above described primary particle size and aspect ratio, it is preferable that the specific surface of the particulate electroconductive material is preferably 50 $m^2/g$ or more. By making the particulate electroconductive material have the primary particle size, aspect ratio, and specific surface in such ranges, the effect of the present invention can be further remarkably exerted.

Setting the total amount of the cathode active material particles, fibrous electroconductive material, particulate electroconductive material, and solid electrolyte described later as 100 mass %, the cathode mixture of the present invention preferably includes the fibrous electroconductive material and particulate electroconductive material in an amount of no less than 0.5 mass % and no more than 2.5 mass % in total. The lower limit is more preferably 0.85 mass % or more, further preferably 1.23 mass % or more, and the upper limit is more preferably 2 mass % or less, further preferably 1.73 mass % or less. By making the total contained amount of the electroconductive materials in such ranges, the output characteristic of a solid battery employing the electroconductive materials further remarkably improves.

The cathode mixture according to the present invention preferably includes the particulate electroconductive material in an amount of no less than 20 mass % and no more than 60 mass %, setting the total amount of the fibrous electroconductive material and the particulate electroconductive material as 100 mass %. The lower limit is more preferably 30 mass % or more, and the upper limit is more preferably 50 mass % or less. By making the ratio of the particulate electroconductive material to the total amount of the electroconductive materials in such a range, the output characteristic when used in a solid battery further remarkably improves.

1.4. Solid Electrolyte

The cathode mixture according to the present invention includes a solid electrolyte. The solid electrolyte is not particularly limited as long as it can conduct ions. Specifically a solid electrolyte having lithium ion conductivity is preferable. For example, a sulfide solid electrolyte and an oxide solid electrolyte can be given. Specifically a sulfide solid electrolyte is preferable. Specific examples thereof include $Li_2S$—$SiS_2$, $LiI$—$Li_2S$—$SiS_2$, $LiI$—$Li_2S$—$P_2S_5$, $LiI$—$Li_2O$—$Li_2S$—$P_2S_5$, $LiI$—$Li_2S$—$P_2O_5$, $LiI$—$Li_3PO_4$—$P_2S_5$, $Li_2S$—$P_2S_5$, and $Li_3PS_4$. A sulfide solid electrolyte produced by a known production method can be adequately used as the sulfide solid electrolyte. For example, starting materials in synthesizing the sulfide solid electrolyte is not particularly limited, and as the synthesis method, a dry ball milling processing, a wet ball milling processing employing heptane and the like, a mechanochemical treatment such as adding mechanical energy to progress chemical reaction, and the like can be adequately employed. The sulfide solid electrolyte may be either amorphous or crystalline. The shape of the sulfide solid electrolyte is not particularly limited either, and for example a powder, particle, lump and matrix of the solid electrolyte can be used.

Setting the total amount of the cathode active materials, fibrous electroconductive material, particulate electroconductive material, and solid electrolyte as 100 mass %, the cathode mixture of the present invention preferably includes no less than 0.5 mass % and no more than 55 mass % of the solid electrolyte. The lower limit is more preferably 3 mass % or more, further preferably 6 mass %, and the upper limit is more preferably 50 mass % or less, further preferably 40 mass % or less. By making the contained amount of the solid electrolyte in such a range, it is possible to obtain a cathode further excellent in ion conductivity and electron conductivity.

1.5. Other Components

In a case where the cathode mixture includes a sulfide solid electrolyte having lithium ion conductivity, the cathode active material particle is preferably covered by a lithium ion conductive oxide, in view of easy prevention of increase in battery resistance, by making it difficult for a high resistance layer to form at the interface between the cathode active material particle and the sulfide solid electrolyte. Examples of the lithium ion conductive oxide which covers the cathode active material particle include oxides represented by a general formula $Li_xAO_y$, (A is B, C, Al, Si, P, S, Ti, Zr, Nb, Mo, Ta or W, and x and y are positive numbers). Specific examples include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$, and $Li_2WO_4$. In a case where the surface of the cathode active material particle is covered by a lithium ion conductive oxide, the lithium ion conductive oxide can cover at least a part of the cathode active material particle, or whole surface of the cathode active material particle. The method of covering the surface of the cathode active material particle with the lithium ion conductive oxide is not particularly limited, and a known method can be employed. The thickness of the lithium ion conductive oxide which covers the cathode active material particle is, for example, preferably no less than 0.1 nm and no more than 100 nm, and more preferably no less than 1 nm and no more than 20 nm.

The cathode mixture according to the present invention may include a binder to bond the cathode active material particle and the like. Any kind of known binder used for a cathode mixture including a solid electrolyte can be used as the binder. Examples of the binder include acrylonitrile butadiene rubber (ABR), butadiene rubber (BR), polyvinylidene fluoride (PVDF), styrene butadiene rubber (SBR), and polytetrafluoroethylene (PTFE). In a case where the cathode mixture includes a binder, the contained amount thereof is, setting the entire cathode mixture as 100 mass %, preferably no less than 0.3 mass % and no more than 5.0 mass %.

It is important that, setting the total number of the plurality of cathode active material particles as 100%, the number of the cathode active material particles in contact with the fibrous electroconductive material via the particulate electrocondytive material is 40% or more, in the cathode mixture acoording to the present invention. Preferably, it is 50% or more and more preferably 60% or more. This makes the cathode mixture have both ion conductivity and electron conductivity. The number of the cathode active material particles in contact with the fibrous electroconductive material via the particulate electroconductive material can be counted visibly by observing the cathode mixture by means of a SEM. Hereinafter how to count the number of the cathode active material particles in contact with the fibrous electroconductive material via the particulate electroconductive material will be explained referring to FIG. 1.

A cathode mixture 10 shown in FIG. 1 includes a solid electrolyte (solid electrolyte matrix) 4 including a plurality of cathode active material particles 1, 1, . . . , a fibrous electroconductive material 2, and a particulate electroconductive material 3.

In the cathode mixture 10, a cathode active material particle 1*a* is in contact only with a particulate electroconductive material 3*a* and the solid electrolyte matrix 4. A cathode active material particle 1*b* is in contact only with the solid electrolyte matrix 4. A cathode active material particle 1*c* is in contact with a fibrous electroconductive material 2*a*, particulate electroconductive materials 3*b* and 3*c*, and the solid electrolyte matrix 4. The particulate electroconductive material 3*c* is in contact with a fibrous electroconductive material 2*b*. A cathode active material particle 1*d* is in contact with a particulate electroconductive material 3*d* and the solid electrolyte matrix 4. The particulate electroconductive material 3*d* is in contact with the fibrous electroconductive material 2*b*. A cathode active material particle 1*e* is in contact with particulate electroconductive materials 3*e* and 3*f*, and the solid electrolyte matrix 4. The particulate electroconductive material 3*e* is in contact with a fibrous electroconductive material 2*c*. A cathode active material particle 1*f* is in contact only with a fibrous electroconductive material 2*d* and the solid electrolyte matrix 4. A cathode active material particle 1*g* is in contact with a particulate electroconductive material 3*g*, the fibrous electroconductive material 2*d*, and the solid electrolyte matrix 4. The particulate electroconductive material 3*g* is in contact with the fibrous electroconductive material 2*c*.

That is, in the cathode mixture 10, the cathode active material particles 1 in contact with the fibrous electroconductive material 2 via the particulate electroconductive material 3 are four particles of the cathode active material particles 1c, 1d, 1e and 1g. The cathode active material particle 1a is "a cathode active material particle in contact with one or more particulate electroconductive materials 3 any of which are not in contact with the fibrous electroconductive material". The cathode active material particles 1b and 1f are "cathode active material particles not in contact with the particulate electroconductive material". Therefore, the cathode active material particles 1a, 1b and 1f do not fall into the "cathode active material particle in contact with the fibrous electroconductive material via the particulate electroconductive material" in the present invention. There are seven cathode active material particles 1 in the cathode mixture 10. Therefore, the number of the cathode active material particles 1 in contact with the fibrous electroconductive material 2 via the particulate electroconductive material 3 is 57% of the total number of the cathode active material particles 1.

As described above, in the cathode mixture according to the present invention, a particulate electroconductive material is used in addition to a fibrous electroconductive material, and the number of cathode active material particles in contact with the fibrous electroconductive material via the particulate electroconductive material is 40% or more of the total number of the cathode active material particles. With the cathode mixture like this, both ion conductivity and electron conductivity can be achieved, and a solid battery having an excellent output characteristic can be obtained by employing the cathode mixture.

2. Production Method of Cathode Mixture

Figure 2:
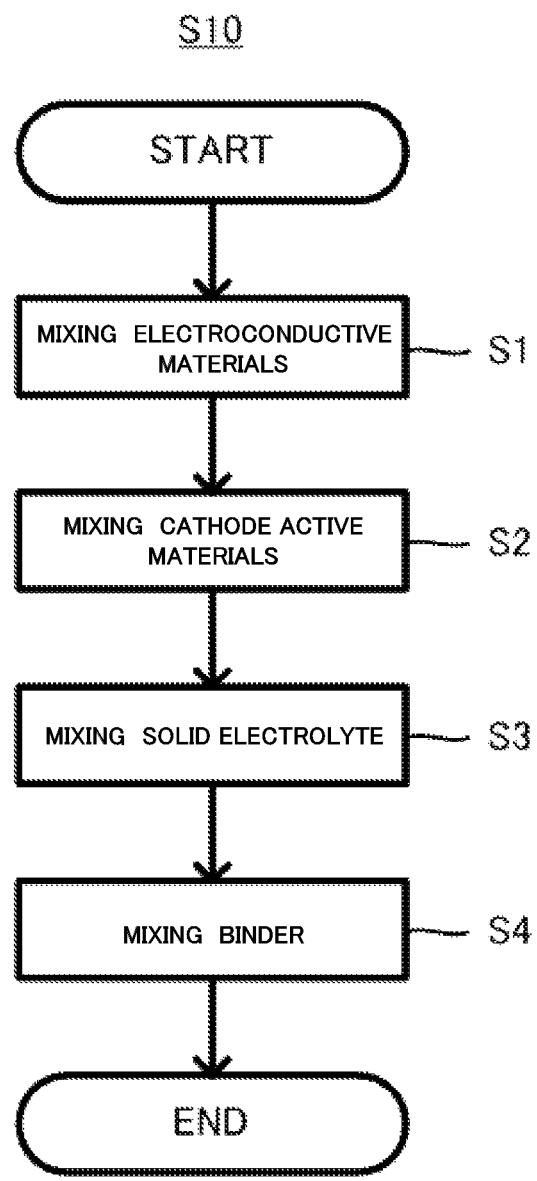
FIG. 2 is a flowchart to explain a production method of the cathode mixture according to the present invention.

The present invention also provides an aspect as a method for producing a cathode mixture. The cathode mixture according to the present invention can be produced efficiently by having a better order of mixing each component. FIG. 2 shows a production method S10 of the cathode mixture of the present invention according to one embodiment. The production method S10 includes a first step (S1) of mixing a fibrous electroconductive material and a particulate electroconductive material to obtain a first mixture, a second step (S2) of mixing the first mixture and a cathode active material to obtain a second mixture, a third step (S3) of mixing the second mixture and a solid electrolyte to obtain a third mixture, and a fourth step (S4) of mixing the third mixture and a binder to obtain a fourth mixture. The fourth step is optional since a binder is an optional component in the cathode mixture according to the present invention as described above.

2.1. First Step (S1)

The first step (S1) is a step of mixing a fibrous electroconductive material and a particulate electroconductive material to obtain a first mixture. In S1, the fibrous electroconductive material and the particulate electroconductive material can be mixed by a dry method without using a solvent, or can be mixed by a wet method with a solvent. In S1, a known mixing method can be used for mixing the fibrous electroconductive material and the particulate electroconductive material. Various mixing methods for example a dry or wet mixing by means of mechanical mixing such as a ball mill and a shaker, or a wet mixing by means of an ultrasonic homogenizer can be applied. Alternatively, the mixing can be carried out by hands with a mortar. However, if an excessive amount of mechanical energy is applied in the mixing of S1, the fibrous electroconductive material can be broken into a particulate form. In S1, although the mixing method is not limited as long as the fibrous electroconductive material and the particulate electroconductive material are mixed, preferably the electroconductive materials are pushed each other so that the particulate electroconductive material is retained on the surface of the fibrous electroconductive material. For example it is preferable that the mixing is carried out while the fibrous electroconductive material and the particulate electroconductive material are pushed each other (mixed by means of a mortar and the like).

In the present invention, it is preferable that the mixing ratio in the first step is adjusted so that the particulate electroconductive material is included in an amount of no less than 20 mass % and no more than 60 mass %, setting the total amount of the fibrous electroconductive material and the particulate electroconductive material as 100 mass %. The lower limit is more preferably 30 mass % or more, and the upper limit is more preferably 50 mass % or less. By making the ratio of the particulate electroconductive material to the total amount of the electroconductive material in such a range, the output characteristic of a solid battery employing the electroconductive material further remarkably improves.

In the present invention, it is important that the fibrous electroconductive material and the particulate electroconductive material are preliminarily mixed. This makes it possible to easily increase in a short time the number of the cathode active material particles in contact with the fibrous electroconductive material via the particulate electroconductive material, in mixing the cathode active material particles in the second step (S2) described later, whereby it is possible to easily produce a cathode mixture having both ion conductivity and electron conductivity.

2.2. Second Step (S2)

The second step (S2) is a step of mixing the first mixture obtained in S1 and cathode active material particles to obtain a second mixture. In S2, the first mixture and the cathode active material particles can be mixed by a dry method without using a solvent, or can be mixed by a wet method with a solvent. In S2, a known mixing method can be used for mixing the first mixture and the cathode active material particles. Various mixing methods for example a dry or wet mixing by means of mechanical mixing such as a ball mill and a shaker, or a wet mixing by means of an ultrasonic homogenizer can be applied. Alternatively, the mixing can be carried out by hands with a mortar. However, if an excessive amount of mechanical energy is applied in the mixing of S2, the fibrous electroconductive material in the first mixture can be broken into a particulate form. On the other hand, if the mechanical energy is too small, it takes a long time for the first mixture and the cathode active material particles to be uniformly mixed, which degrades efficiency. In S2, although the mixing method is not limited as long as the first mixture and the cathode active material particles are mixed, preferably they are pushed each other so that the first mixture is retained on the surfaces of the cathode active material particles. For example it is preferable that the mixing is carried out (mixed by means of a mortar and the like) while the first mixture and the cathode active material particles are pushed each other.

In the present invention, it is important that the first mixture and the cathode active material particles are mixed before the third step (S3) described later. If the cathode active material particles are mixed after the first mixture and a solid electrolyte are mixed, the number of the cathode active material particles in contact with the fibrous electroconductive material via the particulate electroconductive material cannot be increased, or a long time is required to be increased. Therefore it gets difficult to produce a cathode mixture having both ion conductivity and electron conductivity.

2.3. Third Step (S3)

The third step (S3) is a step of mixing the second mixture obtained in S2 and a solid electrolyte to obtain a third mixture. In S3, the fibrous electroconductive material and the particulate electroconductive material can be mixed by a dry method without using a solvent, or by a wet method with a solvent. In addition, the mixing can be carried out by a wet method by adding the second mixture and a solid electrolyte to a solvent with which the solid electrolyte dissolves. In S3, a known mixing method can be used for mixing the second mixture and the solid electrolyte. Various mixing methods for example a dry or wet mixing by means of mechanical mixing such as a ball mill and a shaker, or a wet mixing by means of an ultrasonic homogenizer can be applied. Alternatively, the mixing can be carried out by hands with a mortar. However, if an excessive amount of mechanical energy is applied in the mixing of S3, the fibrous electroconductive material and the active material particles in the second mixture can be broken. On the other hand, if the mechanical energy is too small, it takes a long time for the second mixture and the solid electrolyte to be uniformly mixed, which degrades efficiency.

In the present invention, setting the total amount of the cathode active material particles, fibrous electroconductive material, particulate electroconductive material, and solid electrolyte as 100 mass %, the mixture ratios in the first, second and third steps are preferably adjusted so that the total amount of the fibrous electroconductive material and the particulate electroconductive material are included in an amount of no less than 0.5 mass % and no more than 2.5 mass %. The lower limit is more preferably 0.85 mass % or more and further preferably 1.23 mass % or more, and the upper limit is more preferably 2 mass % or less and further preferably 1.73 mass % or less. By making the total contained amount of the electroconductive materials in such a range, the output characteristic of a solid battery using the electroconductive material further remarkably improves.

In the present invention, it is preferable that the second mixture and the solid electrolyte are mixed before the fourth step (S4) described later. As described later, the binder is preferably mixed in a state of being dissolved with a solvent (a state of a binder solution). If the solid electrolyte is mixed after the second mixture and the binder solution are mixed, the solid electrolyte is difficult to be adequately arranged around the cathode active material, and it might get difficult for the binder to reach all parts of the cathode mixture.

2.4. Fourth Step (S4)

The fourth step (S4) is a step of mixing the third mixture obtained in S3 and a binder to obtain the fourth mixture. In the present invention, the third mixture which does not include a binder can be used as the cathode mixture. On the other hand, in the present invention, the third mixture can include a binder to be used as the cathode mixture. This makes it possible for the cathode mixture to improve the adhesiveness to a current collector, the formability, and the like. In S4, it is preferable to obtain the fourth mixture by: making a binder solution by dissolving a binder with a solvent; mixing the binder solution and the third mixture; thereafter removing the solvent.

As described above, with the production method including the first step (S1) to the third step (S3) and optionally the fourth step (S4), the cathode mixture according to the present invention can be easily produced.

3. Cathode and Production Method Thereof

The present invention also has an aspect of providing a cathode and a production method of the cathode. That is, the present invention provides a cathode including a layer consisting of the cathode mixture according to the present invention, and a production method of a cathode including a step of forming the cathode mixture obtained by the production method according to the present invention.

The cathode can be easily produced by a known method with the cathode mixture according to the present invention. For example, by adding the cathode mixture to a solvent to produce slurry for cathode then applying the slurry for cathode on a base material, thereafter drying the obtained material, a cathode mixture layer can be formed on the base material. As the base material, a various kinds of base materials such as a current collector can be used. As the current collector, any type of known current collector can be applied. Examples of the current collector include Cu, Ni, Al, V, Au, Pt, Mg, Fe, Ti, Co, Cr, Zn, Ge, In, and the like. The current collector can have any form without particular limitations, and can be formed into a foil, plate, mesh, and the like. The current collector can be a layer in which a layer including the above-mentioned metals is laminated on a substrate such as ceramics. Alternatively, a cathode mixture layer can be directly formed on a surface of a solid electrolyte layer which is described later, by applying the slurry for cathode onto the surface of the solid electrolyte layer. Further, it is also possible to produce a cathode without using slurry for cathode. That is, the cathode mixture layer can be obtained by press forming a cathode mixture on a current collector by means of hot press and the like. Alternatively, after obtaining a cathode mixture layer by means of hot press, a current collector can be attached on a surface of the cathode mixture layer.

The cathode according to the present invention is obtained with the cathode mixture described above. Therefore, it has excellent ion conductivity and electron conductivity, and can improve the output characteristic of a solid battery when employed for a cathode of the solid battery.

4. Solid Battery and Production Method Thereof

The present invention also has an aspect of providing a solid battery and a production method of the solid battery. That is, the present invention provides a solid battery including the cathode according to the present invention, a solid electrolyte layer, and an anode, and a production method of a solid battery including a step of laminating the cathode obtained by the production method according to the present invention, a solid electrolyte layer, and an anode. The solid battery is not limited as long as it is provided with the cathode obtained by the above-mentioned production method, and the components in the solid battery other than the cathode can have conventional structures. However, it is preferable that the solid battery is a sulfide all-solid battery including a sulfide solid electrolyte in both its solid electrolyte layer and anode. Most preferably, the solid battery is a sulfide all-solid lithium battery.

4.1. Solid Electrolyte Layer

In producing the solid battery, a solid electrolyte layer needs to be produced. The solid electrolyte layer can be easily obtained by a known method. For example, the solid electrolyte layer can be formed on abase material by: adding a solid electrolyte and a binder to a solvent to produce electrolyte slurry; applying the electrolyte slurry on the base material; and drying the slurry. By removing the base material, the solid electrolyte layer can be obtained. Alternatively, the solid electrolyte layer can be directly formed on a surface of the cathode described above by applying the electrolyte slurry on the surface of the cathode. Or, the solid electrolyte layer can be directly formed on a surface of an anode described later in the same way. Further, the solid electrolyte layer can be produced without using electrolyte slurry. That is, the solid electrolyte layer can be obtained by mixing a powder of the solid electrolyte and a binder in a dry method, then applying a press forming to them by hot press and the like.

The present invention has a characteristic in the cathode (specifically the cathode mixture), and the configuration of the solid electrolyte layer is not particularly limited. Further, the solid electrolyte used for the solid electrolyte layer is not limited to a sulfide solid electrolyte. For example, the solid electrolyte layer can be formed with an oxide-based solid electrolyte. However, in view of obtaining a higher-performance solid battery, it is preferable that the solid electrolyte layer is formed with the above-mentioned sulfide solid electrolyte as a solid electrolyte.

4.2. Anode

In producing a solid battery, an anode needs to be produced. The anode can be easily produced by a known method. For example, an anode layer can be formed on a base material by: adding an anode active material, solid electrolyte, and binder to a solvent to produce slurry for anode; applying the slurry for anode on the base material; and drying the slurry. As the base material, various base materials such as a current collector can be used, as informing the cathode mixture described above. As the current collector, a known current collector as an anode current collector can be used. For example, a copper foil or the like is preferably used. Alternatively, the anode layer can be directly formed on a surface of the above-described solid electrolyte layer by applying the slurry for anode on the surface of the solid electrolyte layer. Further, the anode can be produced without using slurry for anode. That is, the anode layer can be obtained by mixing a powder of the anode active material, a powder of the solid electrolyte and a binder in a dry method, then applying a press forming to them by hot press and the like on a current collector. Alternatively, after obtaining the anode layer by means of hot press, a current collector can be attached to a surface of the anode layer.

The present invention has a characteristic in the cathode (specifically the cathode mixture) and the configuration of the anode is not particularly limited. Further, as the anode active material, a known anode active material of a solid battery can be used. An anode active material which can absorb and release lithium ions is especially preferable. Examples of the anode active material include lithium alloys, metal oxides, carbon materials such as graphite and hard carbon, silicon, silicon alloys, $Li_4Ti_5O_{12}$, and the like. Graphite is especially preferable. The solid electrolyte included in the anode is not particularly limited either, and the above-mentioned sulfide solid electrolyte or oxide-based solid electrolyte can be used. However, in view of obtaining a higher-performance solid battery, it is preferable that the anode is formed with the above-mentioned sulfide solid electrolyte as a solid electrolyte.

The solid battery including the cathode, solid electrolyte layer, and anode in the order mentioned can be produced by: punching the anode and solid electrolyte layer obtained as above, and the above-mentioned cathode in a predetermined size, then laminating them one another; applying a press forming to them at a adequate pressure to integrate them; and optionally attaching thereto a terminal and the like. The solid battery is preferably sealed in a battery case. Here, in the present invention, the cathode mixture having excellent ion conductivity and electron conductivity is used in the cathode. Therefore, a solid battery having an excellent output characteristic can be obtained.

EXAMPLES

Hereinafter the present invention will be described in detail on the basis of Examples. However, the present invention is not limited to the specific embodiments shown below.

Examples 1 to 3, Comparative Examples 1 and 2

(Synthesis of Solid Electrolyte)

As starting low materials, 0.7656 g of $Li_2S$ (manufactured by Nippon Chemical Industrial Co., LTD.) and 1.2344 g of $P_2S_5$ (manufactured by Aldrich) were weighed, and mixed by an agate mortar for 5 minutes. Thereafter 4 g of heptane was added, and mechanical milling was carried out by means of a planetary ball mill for 40 hours, whereby a solid electrolyte was obtained.

(Production of Cathode Mixture)

A fibrous carbon (fiber size 150 µm, aspect ratio 100) in an amount of 0.15 mg as a fibrous electroconductive material and 0.15 mg of Ketjenblack (primary particle size 35 nm, aspect ratio 1.1) as a particulate electroconductive material were weighed, and subjected to a dry mixing by an agate mortar for 30 minutes, whereby a first mixture was obtained. As a cathode active material, 12.03 mg of $LiNi_{3/5}Co_{1/5}Mn_{1/5}O_2$ (secondary particle size 10 µm) was added to the obtained first mixture, and subjected to a dry mixing by an agate mortar, whereby a second mixture was obtained. The above-mentioned solid electrolyte was added to the obtained second mixture, and subjected to a dry mixing by an agate mortar for 5 minutes, whereby a cathode mixture was obtained. A plurality of cathode mixtures were produced with different mixing times (from 0.2 minutes to 12 minutes) of the first mixture (electroconductive materials) and the cathode active material.

The total contained amount of the fibrous electoroconductive material and the particulate electroconductive material in the cathode mixture (hereinafter may be referred to as "contained amount of the electroconductive materials") was 1.73 mass %, and the contained amount of the particulate electroconductive material to the total contained amount of the fibrous electroconductive material and the particulate electroconductive material (hereinafter may be referred to as "ratio of the particulate electroconductive materials") was 50 mass %.

(Production of Anode Mixture)

A graphite in an amount of 9.06 mg as an anode active material, and 8.24 mg of the above-mentioned solid electrolyte were weighed and mixed, whereby an anode mixture was obtained.

(Production of Solid Electrolyte Layer)

The above-mentioned solid electrolyte was weighed in an amount of 18 mg, put on a 1 cm² ceramic mold and pressed at 1 ton/cm², whereby a solid electrolyte layer was produced.

(Production of Solid Battery)

On a surface on one side of the solid electrolyte layer, 17.57 mg of the cathode mixture was put, and pressed at 1 ton/cm², whereby a cathode mixture layer was formed on the surface on one side of the solid electrolyte layer. On the other hand, 17.3 g of an anode mixture was put on a surface on the other side of the solid electrolyte layer, and pressed at 5 ton/cm$^2$, whereby an anode mixture layer was formed on the surface on the other side of the solid electrolyte layer. Thereafter, an aluminum foil was arranged on the surface of the cathode mixture layer as a cathode current collector, and a copper foil was arranged on the surface of the anode mixture layer as an anode current collector. Whereby, a solid battery was produced.

Comparative Example 3

(Production of Cathode Mixture)
A cathode mixture was produced in the same way as above except that only 0.3 mg of the fibrous electroconductive material was contained as the electroconductive material in the cathode mixture. The mixing time of the electroconductive material and the cathode active material particles was 12 minutes.
(Production of Solid Battery)
A solid battery was produced in the same way as in Examples 1 to 3 and Comparative Examples 1 and 2, except that the above-mentioned cathode mixture was used as the cathode mixture.
<Evaluation of Solid Battery>
(Evaluation of Output Characteristic)
Each of the produced solid batteries was subjected to CC/CV charge at 0.3 mA to 4.4 V, thereafter subjected to CC/CV discharge at 0.3 mA to 3.0 V. After that, each battery was charged again to 3.5 V, thereafter discharged at a constant output between 10 mW to 100 mW. Output value of each battery was obtained until 2.5 V for 5 seconds, to compare their outputs. The output of the solid battery according to Comparative Example 3 was made as a reference (output power 1.0), and output ratios of other solid batteries were calculated. Results are shown in Table 1.
(Count of Number of Cathode Active Material Particles in Contact with Fibrous Electroconductive Material Via Particulate Electroconductive Material)
The number of the cathode active material particles in contact with the fibrous electroconductive material via the particulate electroconductive material in the cathode mixture layer was counted by means of SEM observation to obtain "the ratio of the number of the cathode active material particles in contact with the fibrous electroconductive material via the particulate electroconductive material setting the whole number of the cathode active material particles as 100%" (hereinafter may be referred to as "contact ratio"). Results are shown in Table 1. The relationship between the contact ratio and output ratio is shown in FIG. 3.

Figure 3:
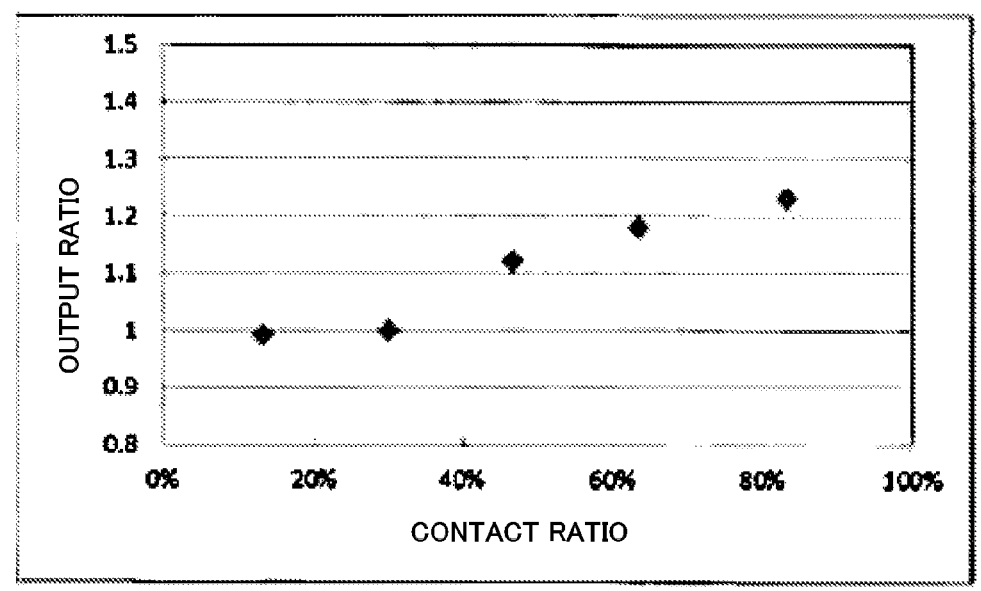
FIG. 3 is a graph to show a relationship between the contact ratio and output ratio regarding solid batteries according to Examples 1 to 3 and Comparative Example 1 and 2.

As is obvious from the results shown in Table 1 and FIG. 3, outputs of the solid batteries remarkably improved when the contact ratio was 40% or more. That is, it can be said that the output characteristic of a solid battery remarkably improves by using a cathode mixture including a plurality of cathode active material particles, a fibrous electroconductive material, a particulate electroconductive material, and a solid electrolyte, wherein setting the total number of the plurality of cathode active material particles as 100%, the number of the cathode active material particles in contact with the fibrous electroconductive material via the particulate electroconductive material is 40% or more. It can be considered this is because: by arranging the particulate electroconductive material between the fibrous electroconductive material and the cathode active material particles, the cathode mixture improved its electroconductivity by the fibrous electroconductive material and the particulate electroconductive material, while securing ion conductive paths between the cathode active material particles and the solid electrolyte, without having surfaces of the cathode active material particles excessively covered by the fibrous electroconductive material.

Examples 4 to 7, Comparative Examples 4 to 7

In the above Examples, a plurality of cathode mixtures were prepared with different mixing times of the electroconductive materials and the cathode active material particles, and the contact ratio and output ratio were measured. Hereinafter examined was a case where the ratio of the particulate electroconductive materials of the cathode mixture was changed.

Figure 4:
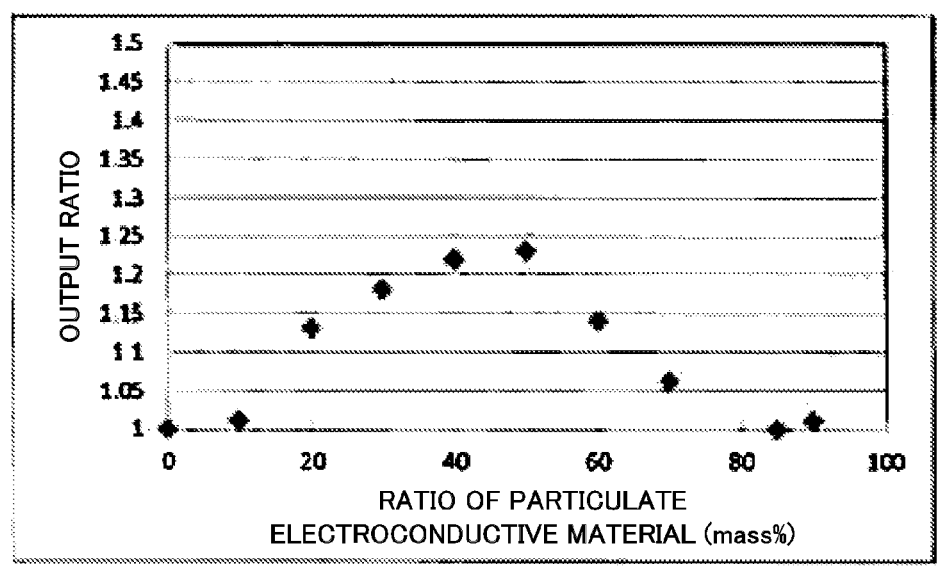
FIG. 4 is a graph to show a relationship between the ratio of the particulate electroconductive material and output ratio regarding solid batteries according to Examples 4 to 7 and Comparative Examples 4 to 7.

The mixing time of the electroconductive material and the cathode active material particles was fixed as 12 minutes, and the contained amount of the electroconductive materials were also fixed as 1.73 mass %. A plurality of cathode mixtures were prepared with different ratios (0 mass % to 90 mass %) of the particulate electroconductive material. From the cathode mixtures, a plurality of solid batteries are made as in the above Examples 1 to 3 and Comparative Examples 1 and 2, and the contact ratios and output ratios were measured. Results are shown in Table 2. The relationship between the ratio of the particulate electroconductive material and the output ratio is shown in FIG. 4.

TABLE 1

|  | mixing time (min) | contained amount of electroconductive material (mass %) | ratio of particulate electroconductive material (mass %) | contact ratio | output ratio |
| --- | --- | --- | --- | --- | --- |
| Comparative Example 1 | 0.2 | 1.73 | 50 | 13% | 0.99 |
| Comparative Example 2 | 0.4 | 1.73 | 50 | 30% | 1 |
| Example 1 | 3 | 1.73 | 50 | 47% | 1.12 |
| Example 2 | 6 | 1.73 | 50 | 63% | 1.18 |
| Example 3 | 12 | 1.73 | 50 | 83% | 1.23 |
| Comparative Example 3 | 12 | 1.73 | 0 | 0% | 1 |

TABLE 2

|  | mixing time (min) | contained amount of electroconductive material (mass %) | ratio of particulate electroconductive material (mass %) | contact ratio | output ratio |
| --- | --- | --- | --- | --- | --- |
| Comparative Example 3 | 12 | 1.73 | 0 | 0% | 1 |
| Comparative Example 4 | 12 | 1.73 | 10 | 22% | 1.01 |
| Example 4 | 12 | 1.73 | 20 | 41% | 1.13 |
| Example 5 | 12 | 1.73 | 30 | 55% | 1.18 |
| Example 6 | 12 | 1.73 | 40 | 67% | 1.22 |
| Example 3 | 12 | 1.73 | 50 | 83% | 1.23 |
| Example 7 | 12 | 1.73 | 60 | 50% | 1.14 |
| Comparative Example 5 | 12 | 1.73 | 70 | 38% | 1.06 |
| Comparative Example 6 | 12 | 1.73 | 85 | 28% | 1 |
| Comparative Example 7 | 12 | 1.73 | 90 | 15% | 1.01 |

As is obvious from the results shown in Table 2 and FIG. 4, the outputs of the solid batteries remarkably improved when the contact ratio was 40% or more, similarly to the results shown in Table 1. Further, it is shown that the ratio of the particulate electroconductive material is preferably no less than 20 mass % and no more than 60 mass %, in order to easily achieve 40% or more of the contact ratio. That is, it can be said that, in the cathode mixture, setting the total amount of the fibrous electroconductive material and particulate electroconductive material as 100 mass %, the particulate electroconductive material is preferably included in an amount of no less than 20 mass % and no more than 60 mass %.

Examples 8 to 12, Comparative Examples 8 to 12

In the above Examples, the contact ratio and output ratio were measured in a case where a plurality of cathode mixtures were prepared with different mixing times of the electroconductive material and cathode active material particles, or where a plurality of cathode mixtures were prepared with different ratios of particulate electroconductive material. Hereinafter examined was a case where the contained amount of the electroconductive material of the cathode mixture was changed.

The mixing time of the electroconductive material and cathode active material particles was fixed as 12 minutes, and the ratio of the particulate electroconductive material was fixed as 50 mass %. A plurality of cathode mixtures were prepared with different contained amounts of the electroconductive material (0 mass % to 3.3 mass %), and a plurality of solid batteries were produced with the cathode mixtures in the same way as in the above Examples 1 to 3 and Comparative Examples 1 and 2. The contact ratios and output ratios of the batteries were measured. Results are shown in the Table 3 below. The relationship between the contained amounts of the electroconductive material and output ratios are shown in FIG. 5.

TABLE 3

|  | mixing time (min) | contained amount of electroconductive material (mass %) | ratio of particulate electroconductive material (mass %) | contact ratio | output ratio |
| --- | --- | --- | --- | --- | --- |
| Comparative Example 8 | 12 | 0 | — | 0% | 0.3 |
| Comparative Example 9 | 12 | 0.1 | 50 | 6% | 0.8 |
| Comparative Example 10 | 12 | 0.2 | 10 | 13% | 1.03 |
| Example 8 | 12 | 0.5 | 50 | 41% | 1.15 |
| Example 9 | 12 | 0.85 | 50 | 58% | 1.19 |
| Example 10 | 12 | 0.23 | 50 | 75% | 1.21 |
| Example 3 | 12 | 1.73 | 50 | 83% | 1.23 |
| Example 11 | 12 | 2 | 50 | 65% | 1.17 |
| Example 12 | 12 | 2.5 | 50 | 43% | 1.1 |
| Comparative Example 11 | 12 | 3 | 50 | 35% | 1.03 |
| Comparative Example 12 | 12 | 3.3 | 50 | 33% | 0.96 |

Figure 5:
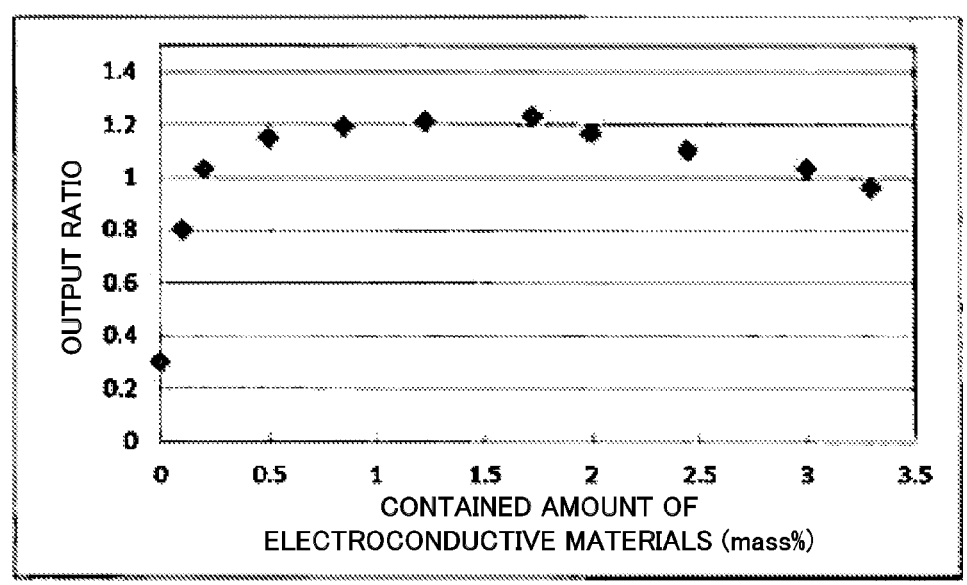
FIG. 5 is a graph in which relationships between the contained amount of the electroconductive material and output ratio regarding solid batteries according to Examples 8 to 12 and Comparative Example 8 to 12 are plotted.

As is obvious from the results shown in Table 3 and FIG. 5, the outputs of the solid batteries remarkably improved when the contact ratio was 40% or more, similarly to the results shown in Tables 1 and 2. It is shown that the contained amount of the electroconductive material is preferably no less than 0.5 mass % and no more than 2.5 mass %, in order to easily achieve 40% or more of the contact ratio. That is, it can be said that, in the cathode mixture, setting the total amount of the cathode active material particles, the fibrous electroconductive material, the particulate electroconductive material, and the solid electrolyte as 100 mass %, the fibrous electroconductive material and the particulate electroconductive material are preferably included in an amount of no less than 0.5 mass % and no more than 2.5 mass % in total.

Examples 13 to 15 and Comparative Examples 13 and 14

In the above Examples, the contact ratio and output ratio in a case where a cathode mixture not including a binder was used was measured. Hereinafter, examined was a case where a cathode mixture including a binder was used.
(Production of Cathode Mixture)

To each of the cathode mixtures according to Examples 1 to 3 and Comparative Examples 1 and 2, polyvinylidene fluoride dissolved in an organic solvent was further added. The obtained material was kneaded with an agate mortar and thereafter dried. Whereby, a cathode mixture including a binder was obtained. The ratio of the binder to the total amount of the cathode mixture was 1.5 mass %.

(Production of Solid Battery)

Solid batteries were produced in the same way as in Examples 1 to 3 and Comparative Examples 1 and 2, except that the above-mentioned cathode mixture including a binder was used as a cathode mixture.

The contact ratios and output ratios of the obtained solid batteries were measured in the same way as above. Results are shown in Table 4 below. The relationship between the contact ratio and output ratio is shown in FIG. 6.

TABLE 4

|  | mixing time (min) | contained amount of electroconductive material (mass %) | ratio of particulate electroconductive material (mass %) | contact ratio | output ratio |
|---|---|---|---|---|---|
| Comparative Example 13 | 0.2 | 1.73 | 50 | 10% | 0.99 |
| Comparative Example 14 | 0.4 | 1.73 | 50 | 33% | 1.01 |
| Example 13 | 3 | 1.73 | 50 | 50% | 1.13 |
| Example 14 | 6 | 1.73 | 50 | 63% | 1.16 |
| Example 15 | 12 | 1.73 | 50 | 80% | 1.22 |

Figure 6:
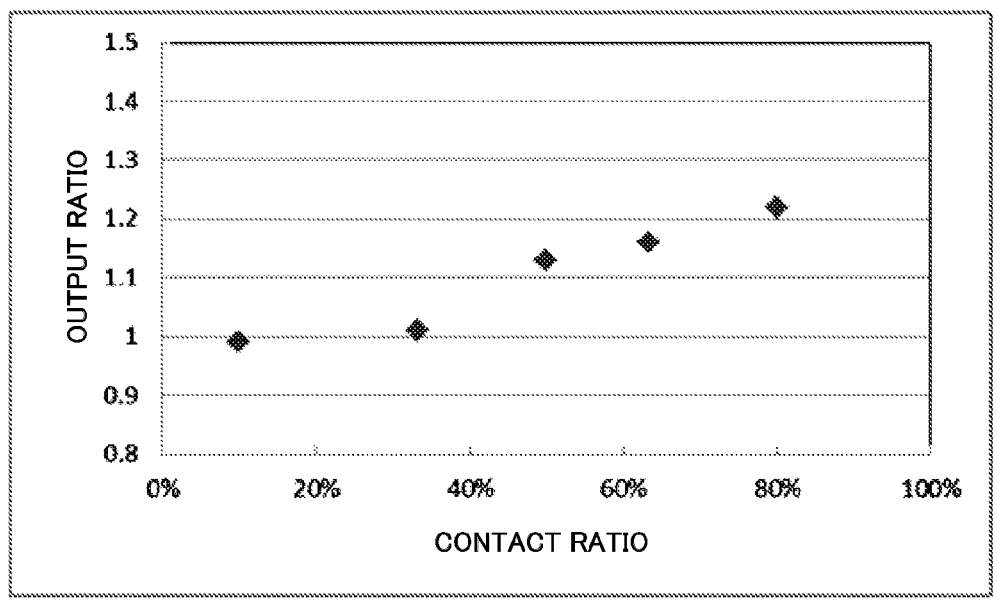
FIG. 6 is a graph in which relationships between the contact ratio and output ratio regarding solid batteries according to Examples 13 to 15 and Comparative Examples 13 and 14 are plotted.

As is obvious from the results shown in Table 4 and FIG. 6, the outputs of the solid batteries remarkably improved when the contact ratio was 40% or more, similarly to the results shown in Tables 1 to 3, even though the cathode mixture included a binder. That is, it is shown that, in order to improve the output characteristic of a solid battery, it is important that the contact ratio of the cathode mixture is 40% or more, whether or not the cathode mixture includes a binder.

Comparative Examples 15 to 18

In the above Examples, examined was a case where the fibrous electroconductive material and the particulate electroconductive material were preliminarily mixed to be the first mixture, thereafter the cathode active material and solid electrolyte were mixed to the first mixture in order, whereby a cathode mixture was produced. Hereinafter, examined was a case where a cathode mixture was produced by mixing all together the fibrous electroconductive material, particulate electroconductive material, and cathode active material particles, without preliminarily mixing the fibrous electroconductive material and particulate electroconductive material.

(Production of Cathode Mixture)

A fibrous carbon in an amount of 0.15 mg as the fibrous electroconductive material, 0.15 mg of Ketjen black as the particulate electroconductive material, and 12.03 mg of $LiNi_{3/5}Co_{1/5}Mn_{1/5}O_2$ as the cathode active material were weighed and subjected to a dry mixing all together with an agate mortar, whereby a mixture was obtained. The obtained mixture and the solid electrolyte were subjected to a dry mixing for 5 minutes with an agate mortar, whereby a cathode mixture was obtained. A plurality of cathode mixtures were produced with different times (4 minutes to 15 minutes) of mixing all together the electroconductive materials and the cathode active material.

(Production of Solid Battery)

Solid batteries were produced in the same way as in Examples 1 and 3 and Comparative Examples 1 and 2, except that the above mentioned cathode mixtures were used as the cathode mixtures of the batteries. The contact ratios and output ratios were measured in the same way as above. Results are shown in Table 5 below. The relationship between the mixing time and the contact ratio is shown in FIG. 7.

TABLE 5

|  | mixing time (min) | contained amount of electroconductive material (mass %) | ratio of particulate electroconductive material (mass %) | contact ratio | output ratio |
|---|---|---|---|---|---|
| Comparative Example 15 | 4 | 1.73 | 50 | 10% | 0.99 |
| Comparative Example 16 | 6 | 1.73 | 50 | 17% | 0.99 |
| Comparative Example 17 | 12 | 1.73 | 50 | 27% | 0.99 |
| Comparative Example 18 | 15 | 1.73 | 50 | 30% | 0.99 |

Figure 7:
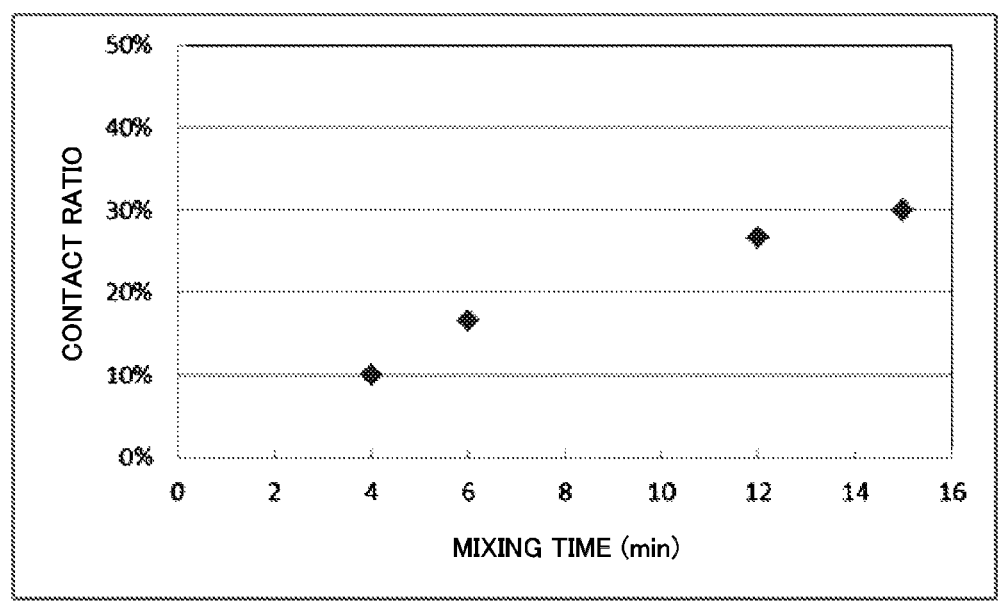
FIG. 7 is a graph in which relationships between the mixing time and contact ratio regarding solid batteries according to Comparative Examples 15 to 18 are plotted.

As is obvious from the results shown in Table 5 and FIG. 7, in a case where the cathode mixture was produced without preliminarily mixing the fibrous electroconductive material and particulate electroconductive material, the contact ratio did not reach 40% or more even though a long time was taken. Any improvement in the output characteristic was not confirmed either.

Comparative Examples 19 to 22

In the above Examples, a case where a cathode mixture was produced by mixing electroconductive materials, a cathode active material, and a solid electrolyte in the order mentioned was examined. Hereinafter examined was a case where a cathode mixture was produced by mixing electroconductive materials, a solid electrolyte, and a cathode active material in the order mentioned.

(Production of Cathode Mixture)

A fibrous carbon in an amount of 0.15 mg as a fibrous electroconductive material, and 0.15 mg of Ketjen black as a particulate electroconductive material were weighed, and subjected to a dry mixing for 30 minutes with an agate mortar, whereby a first mixture was obtained. To the obtained first mixture, a solid electrolyte was added and subjected to a dry mixing for 5 minutes with an agate mortar. Finally, 12.03 mg of $LiNi_{3/5}Co_{1/5}Mn_{1/5}O_2$ was added thereto as the cathode active material and subjected to a dry mixing with an agate mortar, whereby a cathode mixture was obtained. A plurality of cathode mixtures were produced with different mixing times (4 minutes to 15 minutes) of the electroconductive material and the cathode active material.
(Production of Solid Battery)

Solid batteries were produced in the same way as in Examples 1 to 3 and Comparative Examples 1 and 2, except that the above-mentioned cathode mixtures were used as the cathode mixture. The contact ratios and output ratios were measured in the same way as above. Results are shown in Table 6 below. The relationship between the mixing time and contact ratio is shown in FIG. 8.

TABLE 6

| | mixing time (min) | contained amount of electroconductive material (mass %) | ratio of particulate electroconductive material (mass %) | contact ratio | output ratio |
|---|---|---|---|---|---|
| Comparative Example 19 | 4 | 1.73 | 50 | 7% | 0.99 |
| Comparative Example 20 | 6 | 1.73 | 50 | 20% | 0.98 |
| Comparative Example 21 | 12 | 1.73 | 50 | 23% | 0.98 |
| Comparative Example 22 | 15 | 1.73 | 50 | 27% | 0.98 |

Figure 8:
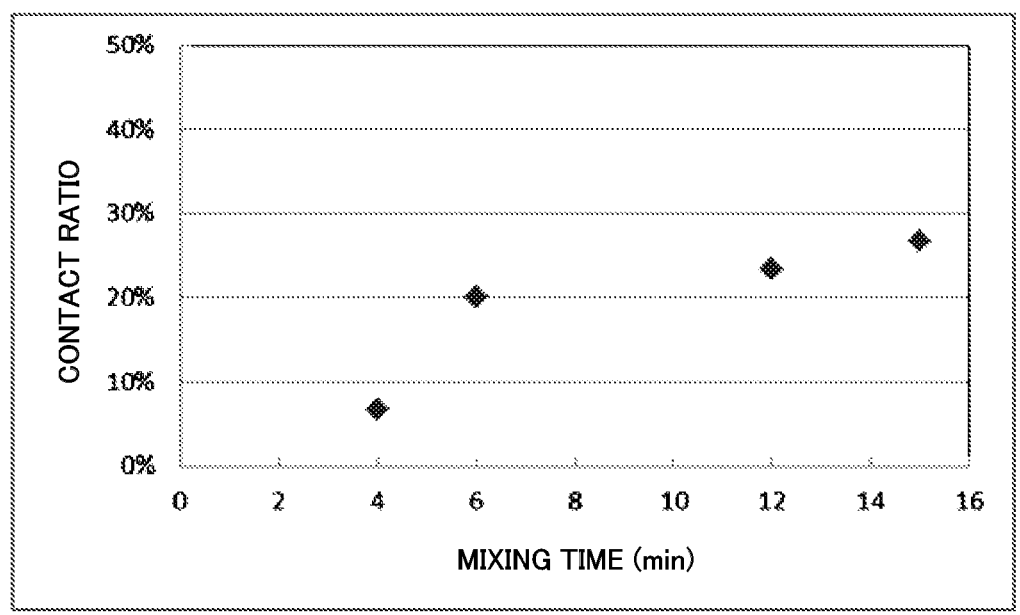
FIG. 8 is a graph in which relationships between the mixing time and contact ratio regarding solid batteries according to Comparative Examples 19 to 22 are plotted.

As is obvious from the results shown in Table 6 and FIG. 8, the contact ratio did not reach 40% or more even though a long time was taken in a case where the mixing order was changed to produce the cathode mixture. Any improvement in the output characteristic was not confirmed either.

From Examples 1 to 15 and Comparative Examples 15 to 22, it is shown that a cathode mixture whose contact ratio is 40% or more and with which the output characteristic of a solid battery can be improved is easily produced, by a production method including a first step of mixing a fibrous electroconductive material and a particulate electroconductive material to obtain a first mixture, a second step of mixing the first mixture and a cathode active material to obtain a second mixture, and a third step of mixing the second mixture and a solid electrolyte to obtain a third mixture.

INDUSTRIAL APPLICABILITY

The cathode mixture according to the present invention can be used for a cathode of a solid battery. The solid battery is excellent in safety and output characteristic, and widely applicable to a large-size power supply for equipping with vehicles and a small-size power supply for equipping with electronic devices.

DESCRIPTION OF REFERENCE NUMERALS

1 cathode active material particle
2 fibrous electroconductive material
3 particulate electroconductive material
4 solid electrolyte
10 cathode mixture

The invention claimed is:
1. A solid battery comprising:
a solid electrolyte layer;
an anode; and
a cathode that includes a layer formed of a cathode mixture comprising:
a plurality of cathode active material particles;
a fibrous electroconductive material;
a particulate electroconductive material; and
a solid electrolyte,
wherein setting a total number of the plurality of cathode active material particles as 100%, number of the cathode active material particles in contact with the fibrous electroconductive material via the particulate electroconductive material is 40% or more,
wherein setting a total amount of the cathode active material particles, the fibrous electroconductive material, the particulate electroconductive material, and the solid electrolyte as 100 mass %, the fibrous electroconductive material and the particulate electroconductive material are included in an amount of no less than 0.5 mass % and no more than 2.5 mass % in total.

2. The cathode mixture according to claim 1, wherein setting a total amount of the fibrous electroconductive material and the particulate electroconductive material as 100 mass %, the particulate electroconductive material is included in an amount of no less than 20 mass % and no more than 60 mass % in total.

3. The cathode mixture according to claim 1, further comprising a binder.

4. A method for producing a solid battery, the solid battery including a solid electrolyte layer, an anode, and a cathode that includes a layer formed of a cathode mixture comprising a plurality of cathode active material particles, a fibrous electroconductive material, a particulate electroconductive material, and a solid electrolyte, the method comprising:
a first step of mixing the fibrous electroconductive material and the particulate electroconductive material to obtain a first mixture;
a second step of mixing the first mixture and the plurality of cathode active material particles to obtain a second mixture; and
a third step of mixing the second mixture and the solid electrolyte to obtain a third mixture,
wherein mixing ratios in the first step and second step are adjusted so that in the second mixture a total number of the plurality of cathode active material particles as 100%, number of the cathode active material particles in contact with the fibrous electroconductive material via the particulate electroconductive material is 40% or more,
wherein mixing ratios in the first step, second step, and third step are adjusted so that in the third mixture a total amount of the cathode active material particles, the fibrous electroconductive material, the particulate electroconductive material, and the solid electrolyte as 100 mass %, the fibrous electroconductive material and the particulate electroconductive material are included in an amount of no less than 0.5 mass % and no more than 2.5 mass % in total.

5. The method according to claim 4, wherein a mixing ratio in the first step is adjusted so that in the first mixture, the particulate electroconductive material is included in an amount of no less than 20 mass % and no more than 60 mass %, setting a total amount of the fibrous electroconductive material and the particulate electroconductive material as 100 mass %.

6. The method according to claim 4, further comprising a fourth step of mixing the third mixture and a binder to obtain a fourth mixture.

7. The method according to claim 4, further comprising a step of forming the cathode mixture from the third mixture.

8. The method according to claim 7, further comprising a step of laminating the cathode, the solid electrolyte layer, and the anode.

* * * * *